Patented Jan. 3, 1933

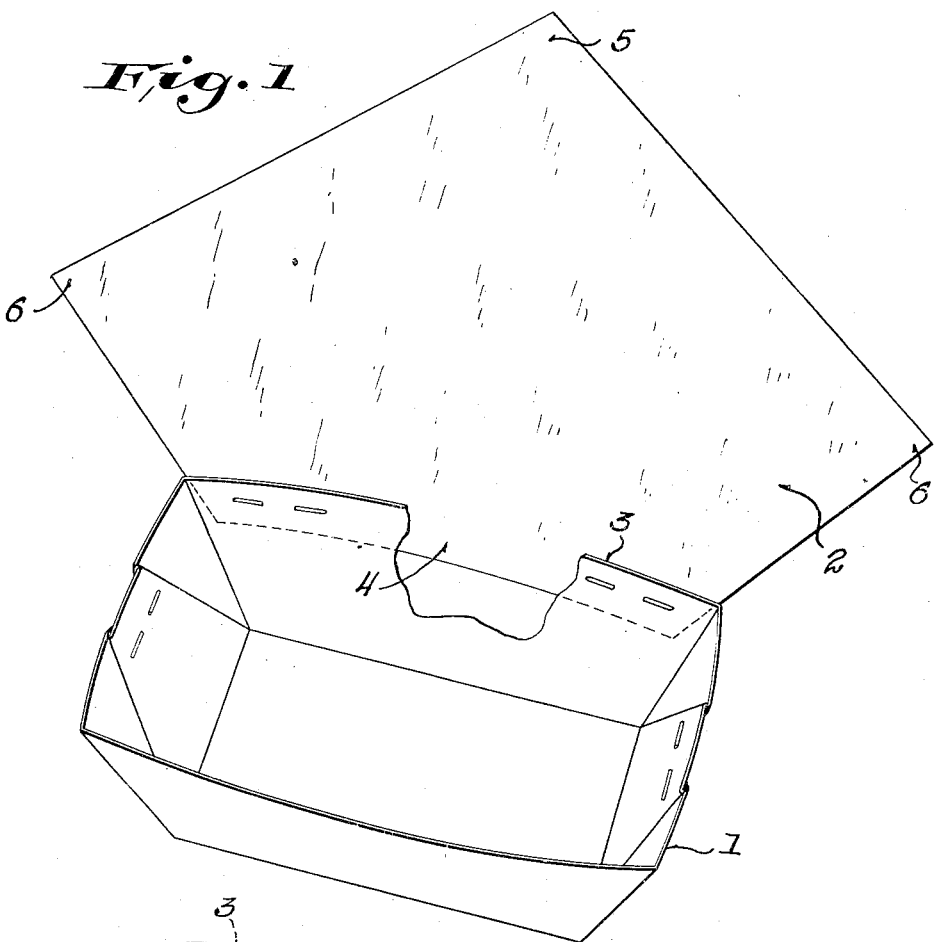
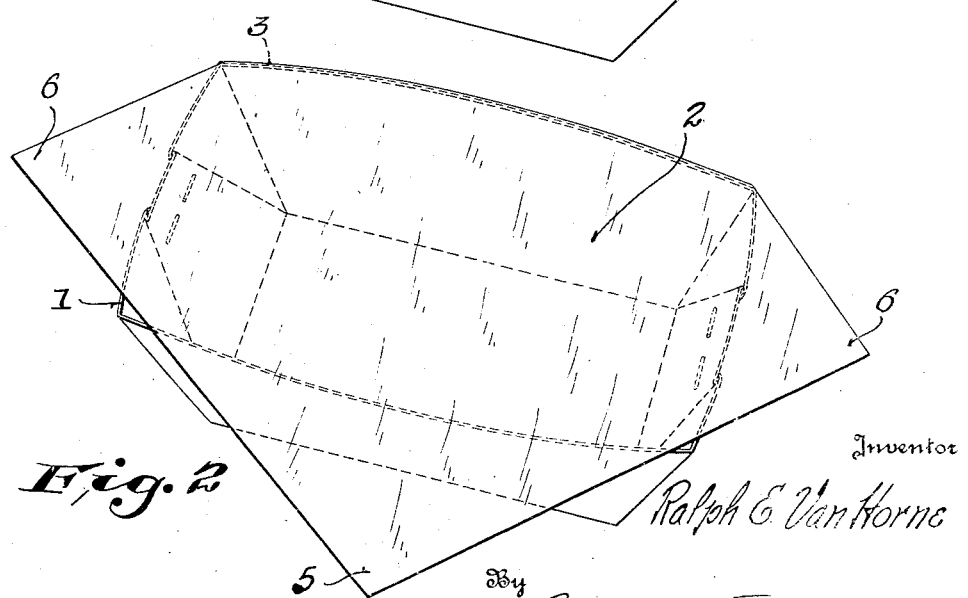

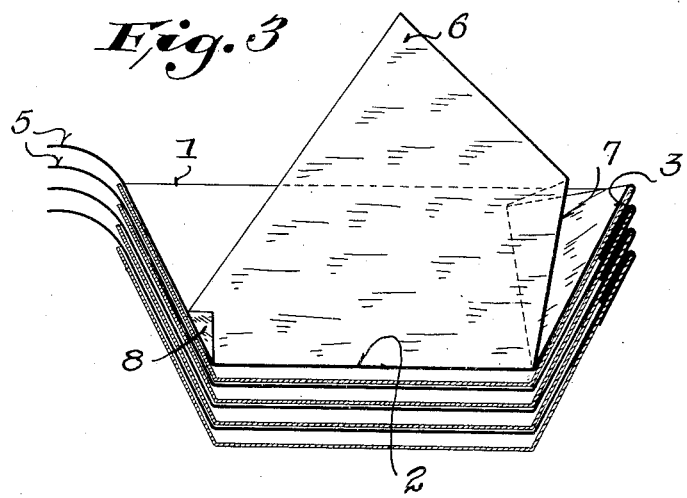
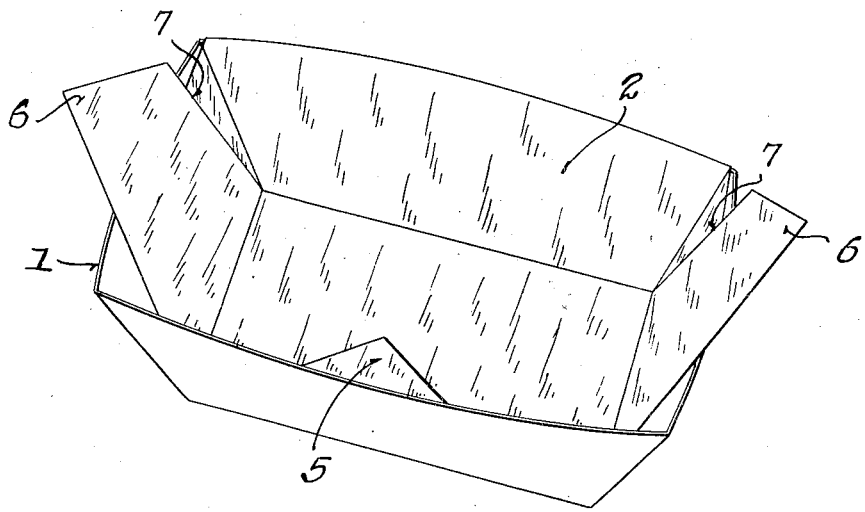

1,892,756

UNITED STATES PATENT OFFICE

RALPH E. VAN HORNE, OF MILWAUKEE, WISCONSIN, ASSIGNOR TO JOSEPHINE A. VAN HORNE, OF MILWAUKEE, WISCONSIN

FOOD CONTAINER

Application filed October 3, 1930. Serial No. 486,093.

This invention relates to food containers, such as those commonly used by merchants in dispensing meat, pickles, and other foods, particularly those which are somewhat moist, although it is to be distinctly understood that the invention is not limited solely to this use.

It is the customary practice among merchants to use what is ordinarily known as paper dishes into which the chopped or ground meat or other food is placed, and to thereafter cover the open dish with a separate piece of paper, either handing the customer the article in this form, or else subsequently again wrapping the package. It is necessary for the merchant to have at least two stacks of articles for this operation, namely, one stack of dishes, and a second and separate stack of paper to cover the dishes after they have been filled. Obviously the merchant is inconvenienced when he has to hold a filled dish in one hand and a separate and single sheet from the stack of sheets with his other hand. From actual experience it has been found that frequently the stack of sheets is spilled or that several sheets are removed at once instead of a single sheet.

Further it is to be noted that the stacked dishes as heretofore used are completely open at their upper ends and consequently dust and other objectionable material collects in the uppermost dish. Obviously when the food is placed in this dish, it is contaminated. Even an attempt to knock out the dust or material does not completely clean the dish.

This invention is designed to overcome the defects noted above and objects of this invention are to provide a novel form of container which may take the form of a paper, fibre, wood, or other dish and which has permanently attached thereto a cover sheet preferably water-proof and freely flexible, so that it may be folded over the food in the dish with its ends overlapping the edges of the dish to thereby completely protect the food and to avoid the necessity of the merchant's reaching for a separate sheet to cover the dish with the difficulty hereinabove noted.

Further objects are to provide a novel form of container or dish which is so made that the cover sheet is permanently attached thereto, and prior to the actual use of the dish, actually protects the interior of the dish from the accumulation of dust or other material, and which is so made that the merchant at one and the same time lifts a dish and its cover sheet from a nested stack of dishes and cover sheets without any effort on his part to separate a particular cover sheet, as each cover sheet and its dish are positioned together as an independent and integral or unitary member.

Further objects are to provide a construction which is so made that the dishes provided with their attached cover sheets may be nested with each cover sheet positioned between its dish and the succeeding dish, and with a tongue or projection extending outwardly from the dish so that when a dish and its corresponding cover sheet are removed from the stack, the merchant may, without shifting his hold upon the dish, catch the projecting portion of the cover sheet and rock it backwardly, thereby uncovering the dish and positioning the sheet out of the way until after the dish has been filled with food.

Further objects are to provide a construction which may be cheaply produced, which is easy to stack, and which is so made that the freely flexible cover sheet automatically is nested into its corresponding dish by the mere positioning of a succeeding dish within the dish under consideration.

An embodiment of the invention is shown in the accompanying drawings, in which:—

Figure 1 is a perspective view of a dish equipped with the cover sheet, and with the cover sheet projecting upwardly therefrom, such view being partly broken away.

Figure 2 is a view showing the cover sheet extended over the dish.

Figure 3 is a transverse sectional view through a series of nested dishes.

Figure 4 is a view showing the way the dish and cover sheet appear immediately after removal from the stack of nested dishes.

Before proceeding to a detailed description, it is to be distinctly understood that the dish, although primarily intended for use in dispensing foods, is nevertheless applicable to other uses, and that the expression "paper" as used in the description and claims is to be interpreted generally rather than specifically. The expression "paper" therefore, is to be understood as covering any of the usual materials of which the dish or cover sheet may be formed. For example, it is well known that these dishes are frequently formed from paper, fiber, wood, or other materials.

In the actual practice of the invention it has been found preferable to pre-form the dishes of paper, fiber, or wood, and to form the cover sheets of waxed paper. This illustration is merely given as one of the many forms that the invention may take, and is not to be considered as in any way limiting.

Referring to the drawings it will be seen that a preformed paper dish 1 has been illustrated, which may consist of a suitably folded or formed sheet of material preferably of approximately rectangular contour. This dish may be formed by folding the material, as indicated in the drawings, or in any other suitable way.

A cover sheet 2, preferably of waxed tissue paper which is freely flexible and may take any desired form during the folding, is attached adjacent one edge, preferably the rear edge 3 of the body portion of the dish. It is attached in any suitable way such as by sewing, stapling, or gluing. The specific form chosen for illustration is provided with a portion 4 which is stapled to the rear face of the dish adjacent its rear edge.

While the cover sheet may take any of several shapes, it is preferable to form it diamond shaped so that it has a projecting tongue 5 and a pair of end tongues 6.

After the cover sheet is secured to the dish, as shown in Figure 1, it is folded over, as shown in Figure 2, so that it extends straight across the top of the dish.

In stacking the dishes, it is obvious that when the upper dish is forced into the lower dish during the nesting process, that the cover sheet 2 is forced down into its dish and will fold, as indicated at 7 and 8 (see Figures 3 and 4), leaving the tongues 5 and 6 slightly projecting. The operator in manufacturing these dishes does not have to give any thought to the proper folding of the cover sheet as it is so made, as has been described above, that it will accurately fold into its dish with the projecting tongue, as described above.

The relative position of the parts when the dishes are nested or stacked, is shown in Figure 3, from which it will be seen that each of the forward tongues 5 projects outwardly beyond the stack. In using the dish the dispenser merely removes a dish from the stack, attention being called to the fact that he can easily catch the dish at one of the forward corners so that his thumb does not engage the cover sheet. Thereafter, he merely catches the tongue 5 in his free hand and rocks the cover sheet backwardly into the position shown in Figure 1. The dish is then filled with the food or other material and the cover sheet is thereafter rocked over the filled dish and the tongues 5 and 6 tucked downwardly on the outer side of the dish.

It is to be particularly noted that the user does not have to reach for a separate sheet to cover the dish, but that he has, instead, the sheets definitely associated and formed as a unitary portion of their respective dishes. Another point which it is desired to emphasize is that the uppermost dish in a stack of dishes necessarily accumulates dust and other material. Heretofore this unsanitary condition could not be remedied in the ordinary use of the stacked paper dishes, which were usually carried in stock in an exposed condition. However, this invention provides the cover sheet, which is located within the dish prior to use, and which, therefore, shields the dish from contamination. Any dust that may collect within the dish is carried on the top of the cover sheet, for the cover sheet occupies the position shown in Figure 4. Obviously therefore, when the user catches the tongue 5 and rocks the cover sheet backwardly, he discharges all of the dust over the cover sheet and exposes a perfectly clean interior surface of the dish.

It will be seen further that the combined dish and cover sheet may be most cheaply produced, as it does not necessitate any unusual or elaborate operation. No additional operation is required, as has been pointed out above, for the assembling of the dishes, and the cover sheets automatically fold themselves within their respective dishes during the nesting operation.

Although this invention has been described in considerable detail, it is to be understood that such description is intended as illustrative rather than limiting, as the invention may be variously embodied and is to be interpreted as claimed.

I claim:

1. A container for foods comprising a preformed paper dish, and a cover sheet attached adjacent one edge of said dish, said cover sheet being formed of thin waxed paper and being normally folded into said dish with a tongue projecting from said dish.

2. A stack of nested dishes, each dish comprising a dish like body portion and a cover sheet folded into said body portion and located between its corresponding dish and the next adjacent dish, each cover sheet having an outwardly extending tongue projecting from the stack of dishes.

3. A container for foods comprising a preformed paper dish and a cover sheet attached adjacent one edge of said dish, said cover sheet being formed of thin, moisture-proof paper, said container being of approximately rectangular contour, said cover sheet being attached to and projecting from one side of said rectangular container, the projecting portion of said cover sheet being approximately of rectangular contour with one corner cut off by the edge of said container adjacent the attached portion of said cover sheet, said cover sheet adjacent such edge being attached to the said rectangular container, whereby the three corner portions of said cover sheet are adapted to extend beyond three sides of said rectangular container.

In testimony whereof, the signature of the inventor is affixed hereto.

RALPH E. VAN HORNE.